United States Patent [19]

Nagai

[11] Patent Number: 4,542,427

[45] Date of Patent: Sep. 17, 1985

[54] MAGNETIC TAPE SETTING DEVICE FOR USE IN MAGNETIC TAPE RECORDING AND/OR REPRODUCING APPARATUS

[75] Inventor: Kiichirou Nagai, Tokorozawa, Japan

[73] Assignee: Pioneer Electronic Corporation, Tokyo, Japan

[21] Appl. No.: 593,189

[22] Filed: Mar. 27, 1984

Related U.S. Application Data

[63] Continuation of Ser. No. 288,041, Jul. 29, 1981.

[30] Foreign Application Priority Data

Aug. 4, 1980 [JP] Japan .................. 55-110415[U]

[51] Int. Cl.[4] ............................................ G11B 15/18
[52] U.S. Cl. .................................. 360/72.1; 360/74.1; 360/74.4
[58] Field of Search ............... 360/71, 72.1, 72.2, 360/27, 74.1–74.7, 72.3

[56] References Cited

U.S. PATENT DOCUMENTS

| | | | |
|---|---|---|---|
| 3,699,527 | 10/1972 | Duerden | 360/72.2 |
| 3,918,090 | 11/1975 | Ludwig et al. | 360/71 |
| 4,297,732 | 10/1981 | Freudenschuss | 360/72.1 |
| 4,301,482 | 11/1981 | Trevithick | 360/72.1 |
| 4,302,784 | 11/1981 | Mussatt | 360/72.1 |
| 4,325,088 | 4/1982 | Wright | 360/27 |

FOREIGN PATENT DOCUMENTS 53-125002  11/1978  Japan ............................ 360/71

Primary Examiner—Donald McElheny, Jr.
Assistant Examiner—Steven R. Garland
Attorney, Agent, or Firm—Fleit, Jacobson Cohn & Price

[57] ABSTRACT

A magnetic tape setting device for use in a magnetic tape recording and/or reproducing apparatus having a magnetic head for recording and/or reproducing, a tape advancing mechanism for advancing the magnetic tape under FF, RVW and PLAY modes, a controller adapted to control the mechanical elements thereof for the FF, RVW and PLAY mode operations to the end of the tape, and a start command signal generator for producing a start command signal when actuated, the magnetic tape setting apparatus being so arranged as to automatically cause, in response to the start command signal, the controller to induce firstly the FF mode operation, secondly RVW mode operation after the completion of the initial FF mode operation, during the second RVW mode operation the trailing edge of the recorded area of the tape being detected, and thirdly again the FF mode operation which is performed by a predetermined period after the detection of the trailing edge of the recorded area of the tape, whereby the magnetic head is automatically positioned at the leading edge of a non-recorded area of the tape i.e. a position suitable for the initiation of recording.

1 Claim, 4 Drawing Figures

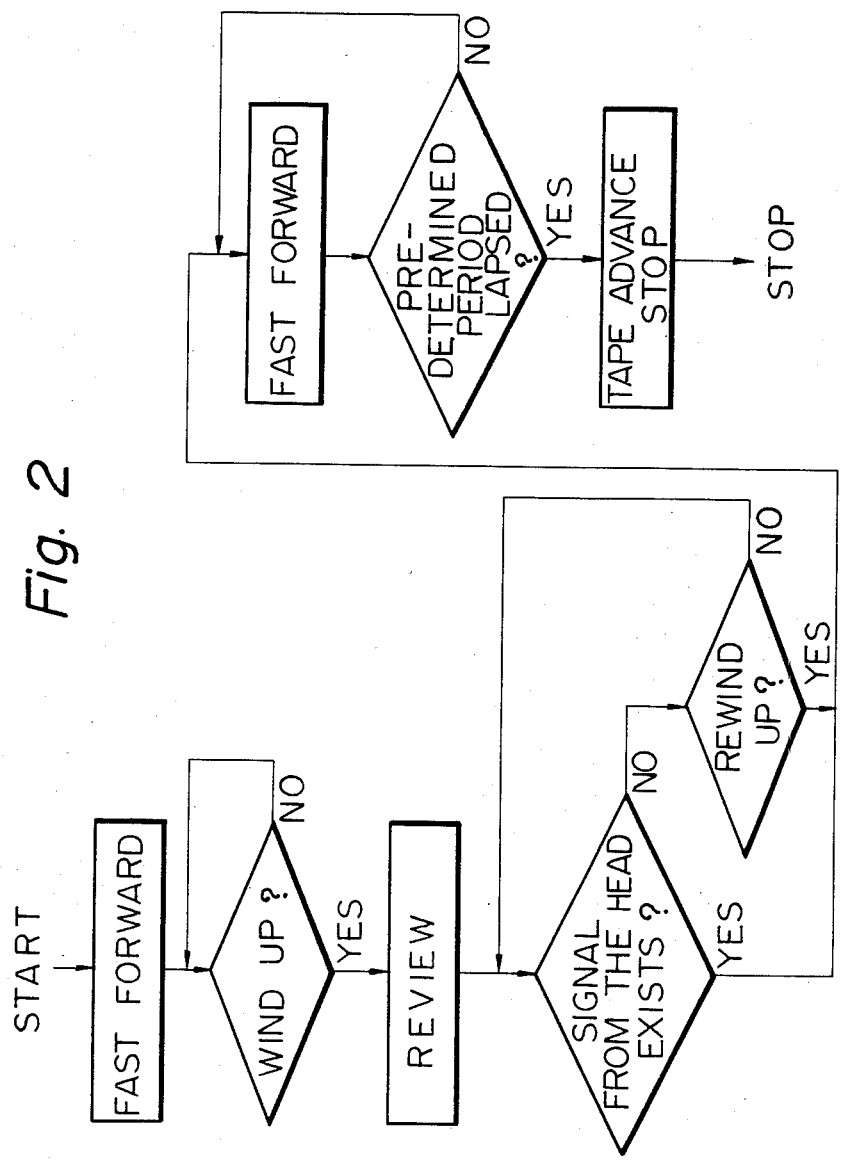

MAGNETIC TAPE SETTING DEVICE FOR USE IN MAGNETIC TAPE RECORDING AND/OR REPRODUCING APPARATUS

This application is a continuation of application Ser. No. 288,041, filed July 29, 1981.

FIELD OF THE INVENTION

The present invention relates to a magnetic tape recording and/or reproducing apparatus, particularly to a control system thereof.

BACKGROUND OF THE INVENTION

A prior art magnetic tape recording and/or reproducing apparatus requires the manual operations for repeatedly indicating fast forward (FF), play-back (PLAY) and/or rewind (REW) in order to detect the initial extremity or the leading edge of a non-recorded area or zone, in which no information is recorded, of a magnetic tape set in the recording and/or reproducing apparatus.

Repetition of such manual operations is much troublesome and therefore such a magnetic tape play-back apparatus is desirous as to be able to quickly and automatically find out the leading edge of the non-recorded area of the tape in position ready for recording without any manual operations.

SUMMARY OF THE INVENTION

The object of the present invention is to provide a magnetic tape setting device for use in a magnetic tape recording and/or reproducing apparatus, which automatically detects the leading edge of a non-recorded area in a magnetic tape and automatically advances and sets the tape in a position ready for recording, that is, the magnetic head is positioned at the leading edge of the non-recorded region of the tape.

In a magnetic tape recording and/or reproducing apparatus provided with the device of the present invention, a magnetic tape is firstly forwardly advanced. The completion of the fast forward feeding action is detected by the device and then the tape is rewound. The tape rewinding action is stopped when the end of a recorded area of the tape is detected. The tape is then fast forward fed again by a certain amount to stop at a position suitable for the initiation of recording.

BRIEF DESCRIPTION OF THE DRAWINGS

The invention will now be described by way of example with reference to the accompanying drawings, in which:

FIG. 2 is a flowchart of the procedures performed by the tape recording and/or reproducing apparatus under the control of the device shown in FIG. 1;

FIG. 3b is a plan view of a magnetic tape having no information recorded thereon, in which the relative movement of the head is shown similarly to FIG. 3a.

DESCRIPTION OF THE PREFERRED EMBODIMENT

Figure 1:
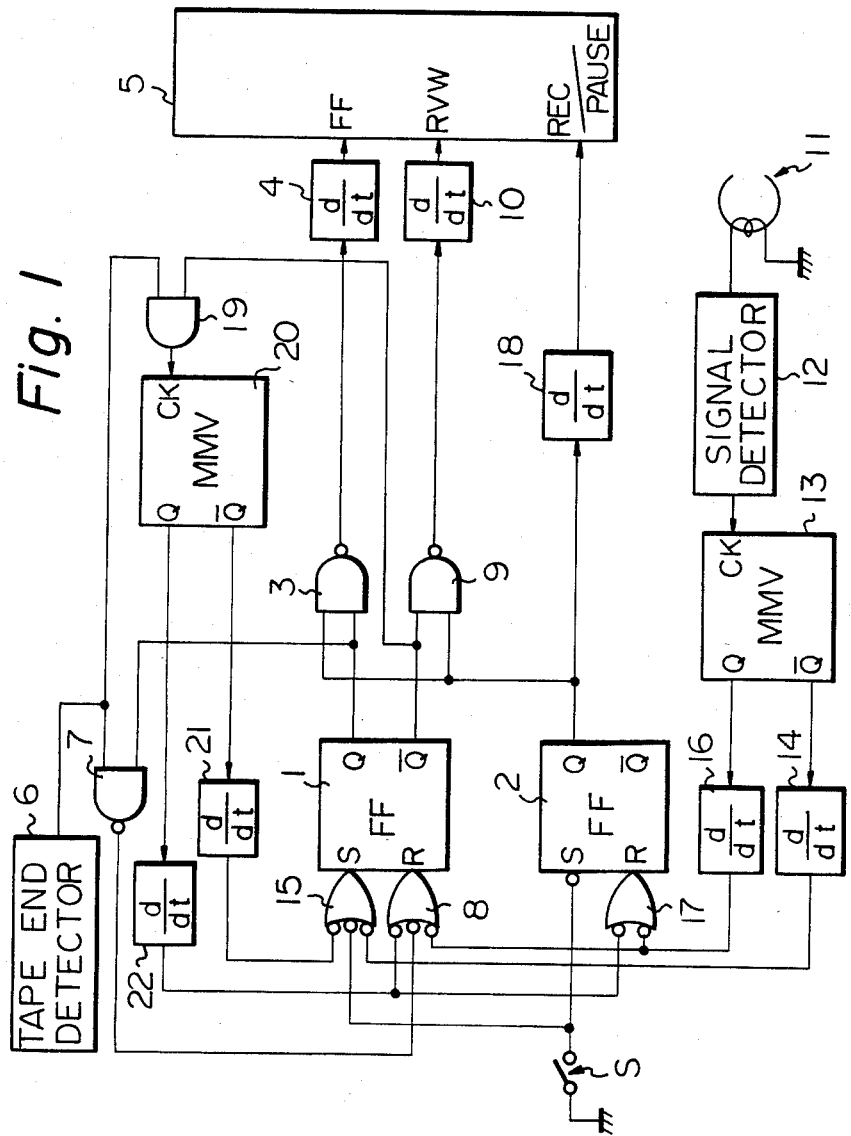
FIG. 1 is a diagram showing a circuit arrangement of an embodiment of the present invention.

Referring now to FIG. 1, there is shown an example of the device according to the present invention, which is arranged to be actuated by closing a normally open start switch S. Two flip flop circuits 1 and 2 are respectively set by closing the start switch S. Upon the closure of the switch S, high level or logic "1" output signals are produced on the Q terminals of these flip flop circuits 1 and 2, which are respectively applied to the inputs of a NAND gate 3. Then, the NAND gate 3 produces a low level or logic "0" signal. the logic "0" signal from the gate 3 is differentiated by a differentiating circuit 4 which then produces a triggering pulse fed to the terminal FF, the controller 5 induces fast forward feeding operation in which a magnetic tape (not shown) mounted in the tape recording and/or reproducing apparatus is quickly forwardly advanced.

To detect the completion of the tape winding action, i.e. forward advancement, a tape end detecting circuit 6 is provided which is so arranged as to produce a tape end signal on the completion of the rewinding action as well as on the completion of the winding action of the tape recording and/or reproducing apparatus. When the tape is wound up on one of the tape reels (not shown) of the recording and/or reproducing apparatus by the fast forward feeding action and the tape reels stop, the tape end detector 6 produces a tape end pulse signal of high level i.e. logic "1". At this moment, with the Q output of the flip flop 1 being still high, the output of a NAND gate 7 turns low, the inputs of which are respectively connected to receive the tape end pulse signal from the detector 6 and Q output of the flip flop 1. The low or logic "0" output of the NAND gate 7 resets the flip flop 1 via a OR gate 8, whereby the Q output of the flip flop 1 turns low and the $\bar{Q}$ output thereof turns high. At this moment, with the other flip flop 2 assuming its set state, the output of a NAND gate 9 turns low, the inputs of which are respectively applied to the $\bar{Q}$ output of the flip flop 1 and Q output of another flip flop 2. The output of the NAND gate 9 is then differentiated by a differentiating circuit 10 which then produces a triggering pulse. The triggering pulse is transmitted to review command input terminal RVW of the control device 5. Triggered by this triggering pulse fed to the review input terminal RVW, the control device 5 induces the review action which is the rewind mode operation while the magnetic head still attaches to the advanced magnetic tape softly or lightly. In the course of the review action, the magnetic head now softly engaging the tape produces an output signal when a recorded area of the tape passes thereby. A signal detecting circuit 12 connected to the head 11 produces a signal in response to the signal from the head 11. The output signal of the detector 12 represents that the magnetic head 11 is facing a recorded area of the tape. A monostable multivibrator 13 connected to the detector 12 changes its $\bar{Q}$ output level from high to low in response to the signal from the detector 12. In response to this level change in the $\bar{Q}$ output of the monostable multivibrator 13, a differentiating circuit 14 connected thereto produces a triggering pulse which is fed to an input of a OR gate 15 thereby to set the flip flop 1. At this moment, with another flip flop 2 still assuming its set state, the output of the NAND gate 3 turns low and thereby a fast forward feeding command signal is again transmitted to the input FF of the control device 5. In response to this fast forward feeding command signal, the control device 5 induces again a fast forward feeding action of the recording and/or reproducing apparatus. Meanwhile, the monostable multivibrator 13 returns from its quasi-stable state to stable state after the lapse of a predetermined time period and its $\overline{Q}$ output turns high and the Q output turns lower. With the monostable multivibrator 13 changing its state, a differentiating circuit 16 whose input is connected to the Q output of the monostable multivibrator 13 produces a triggering pulse which is fed to the inputs of the OR gate 8 and 17 reset both the flip flop circuits 1 and 2. At this instant, with the Q output level of the flip flop 2 turning from high to low, a differentiating circuit 18 connected thereto produces a triggering pulse which is transmitted to an input terminal REC/PAUSE of the controller 5. The controller 5 sets the tape recording and/or reproducing apparatus in a state ready for start of recording. In this way, the magnetic tape mounted in the magnetic tape recording and/or reproducing apparatus incorporated with the device of the present invention is set ready for recording.

When the magnetic tape mounted in the tape recording and/or reproducing apparatus has no information recorded thereon, the tape is rewound up to its forward end by the review mode operation after the initial fast forward feeding action without any signal from the signal detecting circuit 12. A tape end pulse signal is produced by the tape end detecting circuit 6 when the tape is rewound up. With the $\overline{Q}$ output of the flip flop 1 then being high, an AND gate 19 produces a pulse of high level which is fed to a trigger input of a monostable multivibrator 20. The $\overline{Q}$ output of the monostable multivibrator 20 turns from "1" to "0" in response to the high level pulse from the AND gate 19 and a differentiating circuit 21 differentiates this $\overline{Q}$ output thereby to produce a pulse which sets the flip flop 1 via the OR gate 15. The thus set flip flop 1 causes the differentiating circuit 4 to produce a fast forward feeding command signal. After the lapse of a predetermined time period since this instant, the monostable multivibrator 20 returns from its quasi-stable state to stable state and resets both the flip flop 1 and 2 through a differentiating circuit 22 and the OR gates 8 and 17, and a triggering signal is fed to the REC/PAUSE input terminal of the controller 5, whereby the tape setting action is completed.

In FIG. 2 there is shown a flowchart of the procedures done by the device shown in FIG. 1. A device being capable of performing such procedures may not be limited to the circuit arrangement as shown in FIG. 1. For example, such a device may be constructed with the use of a so-called microcomputer of microprocessor.

Figure 3A:
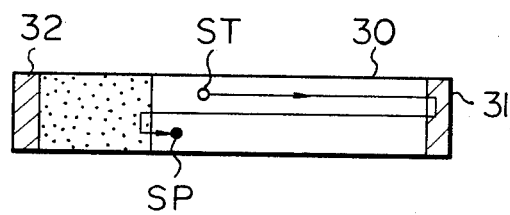
FIG. 3a is a plan view of a magnetic tape having information recorded on an area thereof, in which the position and relative movement of a recording and/or reproducing head of the tape recording and/or reproducing apparatus is schematically shown by a folded line and the recorded area of tape is shown dotted.
Figure 3B:
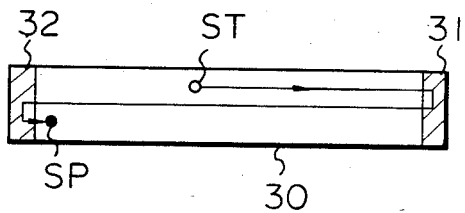

In FIGS. 3a and 3b there are illustrated relative movements of the recording and/or reproducing head to the magnetic tape in the recording and/or reproducing apparatus operating in accordance with the flowchart of FIG. 1.

In the case of FIG. 3a in which the tape has information recorded on an area thereof illustrated with dots, the head initially located at the position ST is shifted firstly by the fast forward feeding action of the recording and/or reproducing apparatus to arrive at the tape end 31. The head is succeedingly shifted in the reversed direction by the rewinding action of the recording and/or reproducing apparatus after the detection of the tape end 31. When the head reaches the trailing edge of the recorded area 32 and the level of signal from the head exceeds a predetermined value, the winding direction is again reversed and the head is moved during a short period of time by the fast forward feeding action of the recording and/or reproducing apparatus to reach and rest at the start position SP i.e. a position ready for recording.

In the case of FIG. 3b in which the tape has no information recorded thereon, the head at last rests and assumes its state ready for recording at a start position SP which is, in this case, slightly spaced from the forward or initial end 32 of the tape 30.

As will be understood from the above description, in accordance with the present invention, it is possible to quickly detect the leading edge of non-recorded area of the tape thereby to automatically place the tape in position ready for recording. Therefore, in accordance with the present invention, troublesome manual operations for setting the tape for recording can be dispensed with.

It is furthermore to be understood that the tape setting device causes the tape set in the tape recording an/or reproducing apparatus to be wound up to the tape end at every tape setting operation which prolongs the life time of the tape.

What is claimed is:

1. In a magnetic tape recording and playback device which includes a magnetic tape, at least one magnetic head for producing an electric signal having an amplitude representative of information recorded on said magnetic tape, drive means for relatively moving the magnetic tape across the magnetic head in at least a fast-forward direction, a reverse direction, and a forward direction in a play mode in response to respective FF, RVW, and PLAY command signals, and limit detection means for detecting the beginning and end of said magnetic tape, the improvement comprising:

a start command signal generating means for producing a start command signal on demand; and a start point locating means for positioning said magnetic head at a beginning point of a non-recorded area of said magnetic tape in response to said start command signal, said start point locating means including sequence means connected to said magnetic head and said limit detection means, for producing in an ordered sequence, said FF command signal until said limit detection means detects the end of said magnetic tape, said RVW command signal until said electric signal detected by the magnetic head exceeds a predetermined level or until said limit detection means detects the beginning of said magnetic tape, and said FF command signal for a predetermined time period after termination of said RVW command signal thereby to position the magnetic head at a location from which information can be recorded.

* * * * *